3,211,500
BOOSTER-ASSISTED HYDRAULIC BRAKING
SYSTEMS
Thomas Gordon Lawson, Birmingham, England, assignor to Girling Limited, Tyseley, Birmingham, England, a British company
Filed Mar. 6, 1964, Ser. No. 350,019
Claims priority, application Great Britain, Mar. 13, 1963, 9,873/63
8 Claims. (Cl. 303—22)

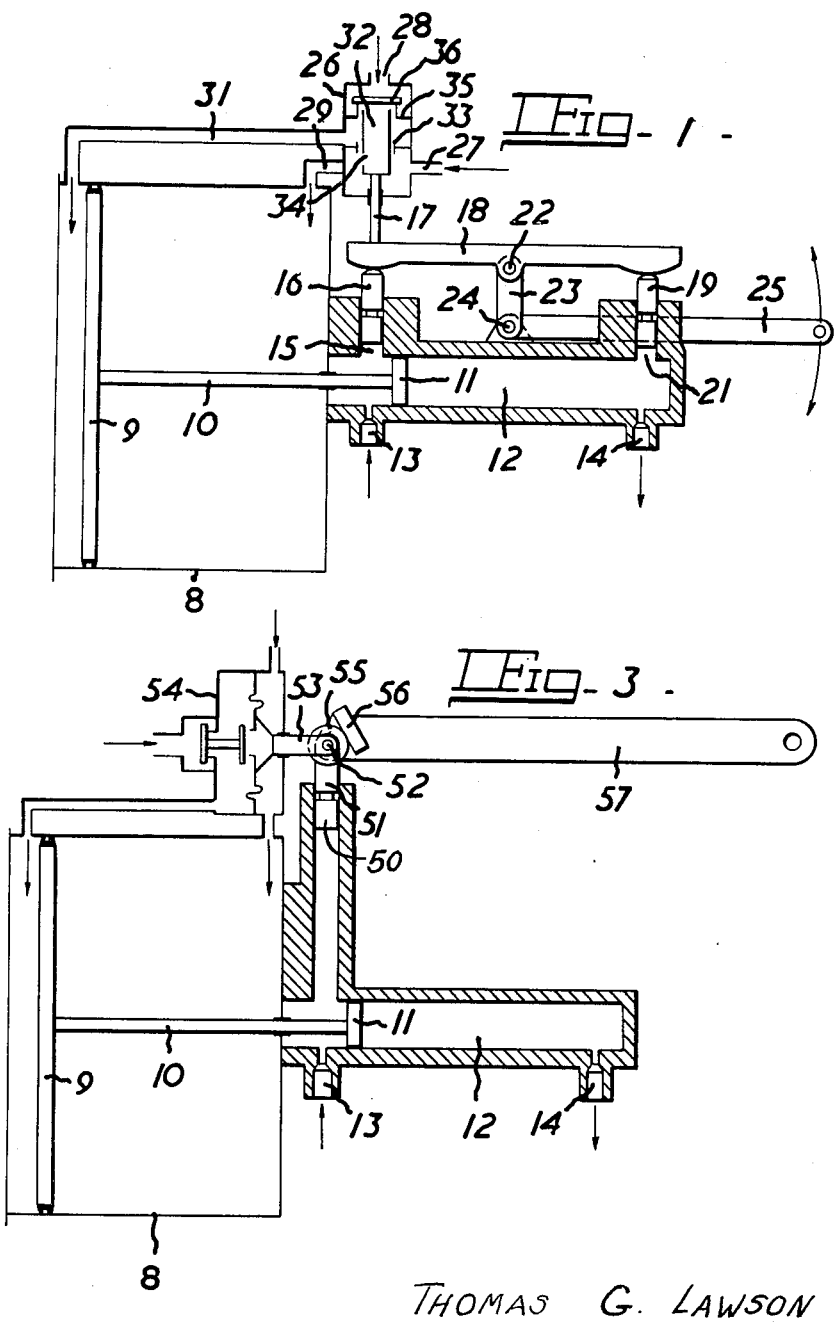

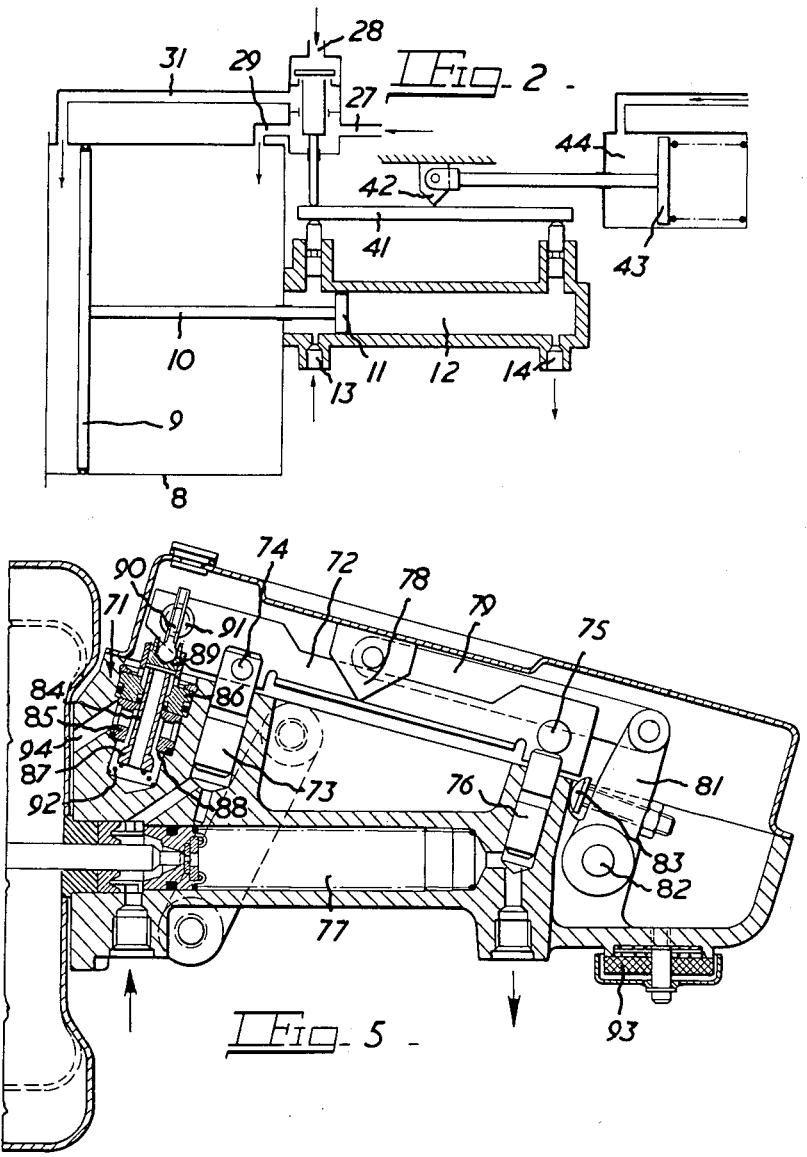

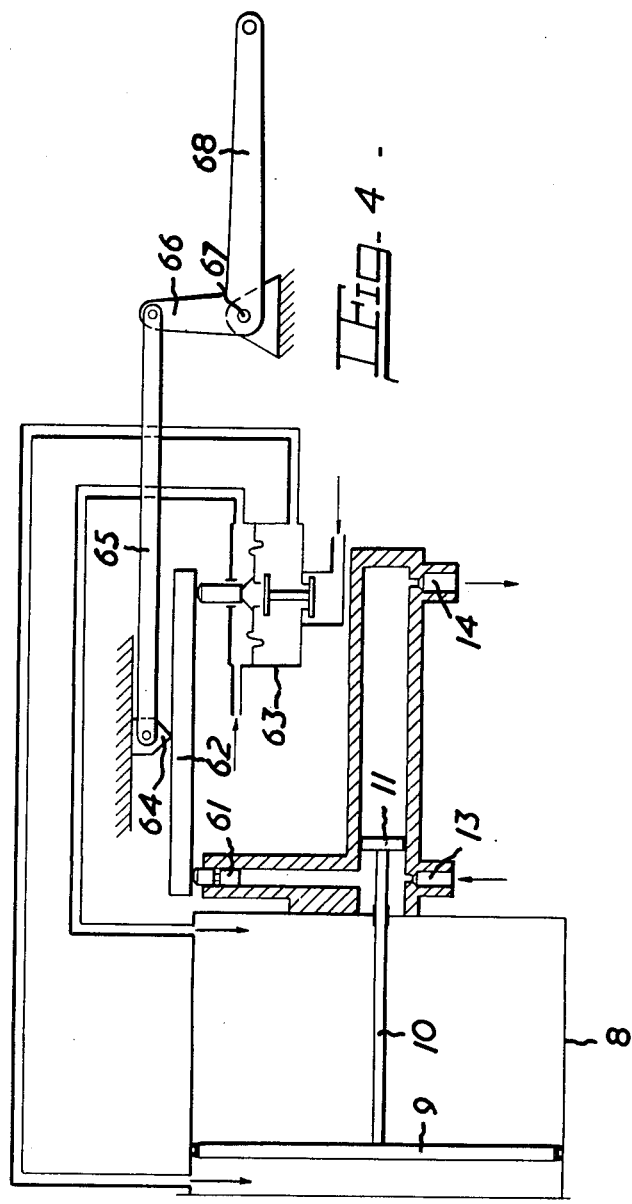

This invention relates to improvements in booster-assisted hydraulic braking systems for vehicles of the kind in which liquid under pressure generated by a pedal-operated master cylinder acts on the piston of an auxiliary cylinder supplying liquid under pressure to the brake cylinders and on a valve which, when the pressure generated by the master cylinder reaches a predetermined value, energises a fluid pressure booster acting on the piston of the auxiliary cylinder to increase the braking effort.

According to our invention, in a braking system of that kind the master cylinder pressure acts on the control valve for the booster through means sensitive to operating conditions such as the loading of the vehicle or the loading of an axle whereby the assistance provided to the braking effort by the booster is automatically adjusted in accordance with operating conditions.

There may be a single booster assisting the braking on all the wheels of the vehicle and controlled in accordance with the total loading, or there may be two boosters for assisting the braking on the front and rear wheels respectively and controlled in accordance with the loading on the respective axles.

Alternatively, where a single booster is employed, it may be arranged to control only the braking of the rear wheels.

Our invention is also applicable to tractor-trailer combinations in which case there may be more than two boosters in the braking system.

The control mechanism can be arranged in various ways.

Several forms of our invention are illustrated by way of example in the accompanying drawings in which:

FIGURES 1 to 4 are diagrammatic sections of boosters incorporating different methods of controlling the operation of a booster in accordance with the loading of a vehicle or of an axle; and FIGURE 5 is a longitudinal section of one practical form of control.

In each of FIGURES 1 to 4 a booster cylinder is shown at 8. A piston 9 working in the cylinder is attached to a piston-rod 10 carrying at its forward end a piston 11 working in an auxiliary master cylinder 12 in axial alignment with the booster. Hydraulic fluid under pressure is supplied by a pedal-operated master cylinder or the like through a connection 13 to the rear end of the cylinder 12 behind the piston 11 and acts on the piston to apply pressure to fluid in the cylinder 12 of which the forward end has an outlet 14 adapted to be connected to the slave cylinders of the vehicle brakes.

In the arrangement shown in FIGURE 1 the space in the cylinder 12 behind the piston is in communication with the inner end of a bore 15 in which works a primary control piston 16, the axis of the cylinder being in alignment with the stem 17 of a control valve described below. One end of a rocking lever or balance beam 18 is interposed between the piston 16 and the stem 18, and the other end of the lever or beam is engaged by a secondary control piston 19 working in a bore 21 opening out of the forward end of the auxiliary master cylinder 12, the piston 19 being exposed to the pressure in the cylinder 12 which is the pressure applied to the brakes.

The lever or beam is angularly movable about a pivot pin 22 located at or about the middle of its length and mounted in the free end of an arm 23 fixed in a spindle 24.

A lever arm 25 is also fixed on the spindle and the free end of this arm is coupled to a part of the vehicle movable with spring deflection.

The control valve is located in a housing 26 having a connection 27 to a source of vacuum such as a vacuum pump or the inlet manifold of an engine by which the vehicle is driven, a connection 28 to atmosphere, and connections 29 and 31 to the booster cylinder 8 on opposite sides of the piston 9. The valve comprises a hollow plunger 32 attached to the stem 17 and guided in a bearing 33 in the housing, the plunger having a lateral opening 34 which maintains the interior of the plunger at all times in communication with the connections 27 and 29. Above the plunger is a transverse partition 35 in which is an opening within a seating engaged by a movable valve member 36, the space in the housing above the seating being at all times in communication with the atmospheric connection 28. In the off position of the brake the various parts of the mechanism are in the positions shown in the drawing, the chambers in the booster on opposite sides of the piston 11 both being under vacuum. When the plunger is raised by the control piston 16 acting on the stem 18 its upper end first engages the valve member 36 and cuts off communication between the vacuum connection 27 and the connection 31 to the chamber in the booster cylinder at the rear of the piston. Further upward movement of the plunger lifts the valve member 36 off its seating and allows air from the connection 28 to flow to the booster chamber at the rear of the piston to energise the booster.

The movement of the valve plunger to energise the booster is effected by the master cylinder pressure acting on the primary control piston, the movement being transmitted through the rocking lever or beam 18. The secondary pressure generated in the auxiliary master cylinder acting on the secondary control piston 9 rocks the lever or beam in the opposite direction to move the control valve into the balanced position or to de-energize the booster when the master cylinder pressure is relieved, and the leverage through which the two control pistons act on the lever or beam is varied by angular movement of the lever arm 25 and the spindle 24 in accordance with the loading of the vehicle.

In the arrangement shown in FIGURE 2 the control pistons act on the control valve through their engagement with opposite ends of a balance beam 41 adapted to rock about a knife edged fulcrum 42. The position of the fulcrum along the length of the beam is varied in accordance with the vehicle loading by a spring-loaded piston 43 working in a pneumatic cylinder 44 connected to a pneumatic suspension spring which forms part of the vehicle suspension and the presure which varies with the loading of the vehicle.

In the arrangement shown in FIGURE 3 a control piston 50 exposed to the master cylinder pressure acts through a rocking plunger 51 on a pin 52 which actuates through another plunger 53 a control valve 54, the plungers 51 and 53 being substantially at right angles to each other. The pin 52 carries a roller 55 engaging with an inclined plane 56 which pivots about a point co-axial with the pin 52 and of which the outer end is connected to a sprung part of the vehicle so that the inclination of the inclined plane and hence the movement of the valve spindle effected by a given pressure applied to the control piston varies with the loading of the vehicle.

In the arrangement shown in FIGURE 4 a control piston 61 exposed to the master cylinder pressure acts on one end of a balance beam 62 of which the other end actuates a control valve 63. The balance beam rocks about a knife edge fulcrum 64 which is moved longitudinally to vary the leverage through which the control pistons act on the valve. The fulcrum is attached to one end of a link 65 of which the other end is pivotally connected to one arm 66 of a bell crank lever pivoted at 67 on a fixed point. The other arm 68 of the lever is coupled by any convenient means to a sprung part of the vehicle.

The mechanism shown in FIGURE 5 is the same in principle as that shown diagrammatically in FIGURE 3.

The control valve 71 is actuated by one end of a balance beam 72. The outer end of a primary control piston 73 exposed to the master cylinder pressure is pivotally connected by a pin 74 to the beam adjacent to the valve. The other end of the beam carries a pin 75 on which bears the outer end of a secondary control piston 76 which is exposed to the pressure in the auxiliary cylinder 77, that is, the pressure applied to the brakes. The beam rocks about a fulcrum 78 which is movable longitudinally with respect to the beam by means of a link 79 pivotally connected to an arm 81 on a spindle 82. A lever arm (not shown) is carried by the spindle 82 and is connected to a sprung part of the vehicle for varying the position of the fulcrum in accordance with the vehicle loading.

An adjustable stop 83 is provided for the arm 81 to limit the movement of the fulcrum in one direction.

The control valve 71 is shown in the normal open position in which the chambers in the booster on both sides of the piston are under vacuum. The valve comprises a hollow stem 84 which is axially movable through sealed guides 85 and 86 and carries on its inner end a rubber-faced head 87 which is normally spaced from an annular vacuum valve seat 88.

The outer end of the stem is normally in engagement with an axially movable valve head 89 coupled by a pin 90 to a peg 91 mounted in the balance beam.

The stem 84 is loaded by a light spring 92 urging it outwardly.

When pressure is applied to the primary control piston 73 by the master cylinder the balance beam is rocked about its fulcrum in a clockwise direction and the valve head 89 moves outwardly and the stem 84 follows it so that the head 87 engages the seat 88 and cuts off the rear end of the booster cylinder from vacuum. Then on further outward movement of the valve head 89 with the balance beam the head 89 moves away from the outer end of the stem 84 and air entering the valve housing through a filter 93 is allowed to flow through the hollow stem 84 and a passage 94 into the rear chamber of the booster to energise the booster. As pressure builds up in the auxiliary cylinder 77 the secondary control piston tends to rock the balance beam about its fulcrum in the opposite direction to that in which it is rocked by the primary control piston and hence the operation of the valve and the energisation of the booster are controlled by the balance of the pressure generated by the master cylinder and that applied to the brakes.

The pressure differences across the vacuum valve and air valve act in a direction tending to maintain these valves closed so that the spring 92 need only be of sufficient strength to overcome seal friction and cause the stem 84 to follow up the movement of the valve head 89.

In any of the arrangements shown in FIGURES 2, 4 and 5 the knife edged fulcrum illustrated may be replaced by a roller or by a pivoted slipper.

It will be appreciated that our invention provides continuous and automatic adjustment of the assistance provided to the braking effort by the booster in accordance with the loading of a wheel or axle. Variations in loading may be static and due to changes in the number of passengers or weight of goods carried, or they may be dynamic and due to changes in the inclination of the vehicle or to the transfer of weight when the vehicle is being decelerated.

I claim:

1. A braking system for vehicles comprising a pedal-operated master cylinder, an auxiliary cylinder and piston assembly connected to wheel brake cylinders and receiving liquid from the master cylinder, a fluid-pressure booster adapted to act on the piston of the auxiliary cylinder to increase the effort applied to said piston by the master cylinder pressure, a valve controlling the energisation of the booster, means actuated by the master cylinder pressure for actuating the control valve, and means sensitive to loading of a braked wheel interposed between said means actuated by the master cylinder and the control valve whereby the effort provided by the booster is automatically adjusted in accordance with the wheel loading.

2. A braking system for vehicles as in claim 1 wherein said means for actuating the control valve comprises a rocking lever, primary and secondary control pistons exposed respectively to the master cylinder pressure and to the pressure in the auxiliary cylinder and engaging the rocking lever at spaced points, and a fulcrum for said lever of which the position along the length of the lever is automatically adjusted in accordance with the loading of a braked wheel.

3. A braking system for vehicles as in claim 1 wherein said means for actuating the control valve comprises a rocking lever of which one end actuates the control valve, a control piston exposed to the master cylinder pressure and acting on the other end of the lever, a fulcrum for said lever, and means sensitive to the loading of a braked wheel for automatically adjusting the position of the fulcrum along the length of the lever in accordance with the wheel loading.

4. A braking system for vehicles as in claim 1 wherein said means for actuating the control valve comprises a control piston exposed to the master cylinder pressure, and means transmitting movement of said piston to the control valve including an inclined plane of which the inclination is varied by means sensitive to the loading of a braked wheel.

5. A braking system as in claim 2 wherein said control valve comprises a first valve head coupled to and movable with said rocking lever, a hollow stem carrying a second valve head, a seating with which said second head co-operates to control the connection of the booster to vacuum, and means causing the stem to follow up movement of said first valve head until said second valve head engages said seating, subsequent movement of said first valve head away from said stem admitting air to a power chamber of the booster.

6. A braking system for vehicles comprising a manually controlled source of fluid under pressure, a cylinder and piston assembly having first and second ends of which the first end is connected to wheel brake cylinders and the second end is connected to said source, a fluid pressure booster adapted to act on said piston to increase the effort applied to it by fluid from said source, a valve controlling the energization of the booster, means actuated by the pressure of fluid from said source for actuating the control valve, and means sensitive to the loading of a braked wheel interposed between said means actuated by the pressure of fluid from said source and the control valve whereby the effort provided by the booster is automatically adjusted in accordane with the wheel loading.

7. An hydraulic cylinder and fluid-pressure booster assembly for a vehicle braking system comprising a cylinder and piston assembly having first and second ends of which the first end is connected to wheel brake cylinders and the second end is connected to a manually controlled source of fluid under pressure, a fluid pressure booster adapted to act on said piston to increase the effort applied to it by fluid from said source, a valve controlling the energization of the booster, a rocking lever actuated by the pressure of fluid from said source for actuating said control valve, a movable fulcrum for said lever, and means for moving said fulcrum relative to said lever for varying the effort applied by the booster to said piston.

8. An hydraulic cylinder and fluid-pressure booster assembly for a vehicle braking system incorporating means sensitive to the loading of a braked wheel, comprising a cylinder and piston assembly having first and second ends of which the first end is connected to wheel brake cylinders and the second end is connected to a manually controlled source of fluid under pressure, a fluid-pressure booster adapted to act on said piston to increase the effort applied to it by the fluid from said pressure source, a valve controlling the energization of the booster, means actuated by the pressure of fluid from said pressure source for actuating said control valve, and means adapted to be actuated by said means sensitive to the loading of a braked wheel interposed between the control valve and said means actuated by the pressure of fluid from said pressure source for automatically adjusting the effort provided by the booster in accordance with the wheel loading.

References Cited by the Examiner
UNITED STATES PATENTS

| | | | |
|---|---|---|---|
| 2,407,870 | 9/46 | Cook | 303—22 |
| 3,114,241 | 12/63 | Hager | 60—54.5 |

A. HARRY LEVY, *Primary Examiner.*

EUGENE G. BOTZ, *Examiner.*